Oct. 11, 1966      D. E. TICKNOR      3,278,766
EMERGENCY STOP SIGNALING DEVICE FOR AUTOMOBILES
Filed Oct. 17, 1963      2 Sheets-Sheet 1
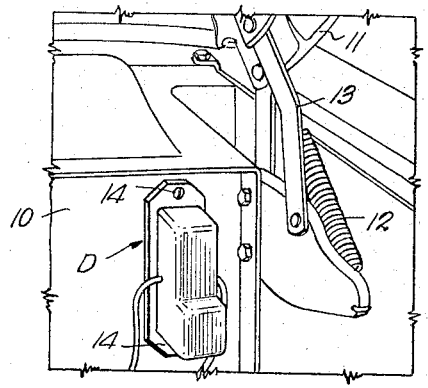
Fig. 1.
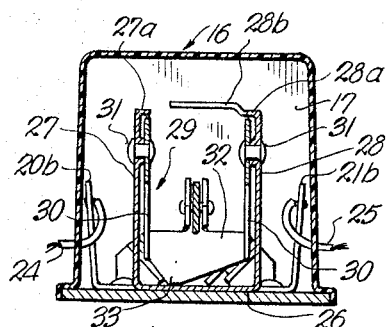
Fig. 5.
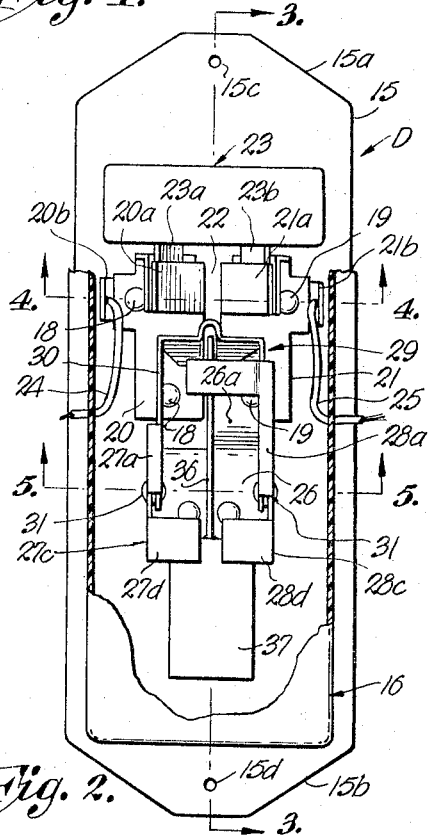
Fig. 2.
Fig. 3.
Fig. 4.
INVENTOR.
Donald E. Ticknor
BY
Scofield, Kokjer, Scofield & Lowe
ATTORNEYS.

Oct. 11, 1966  D. E. TICKNOR  3,278,766
EMERGENCY STOP SIGNALING DEVICE FOR AUTOMOBILES
Filed Oct. 17, 1963  2 Sheets-Sheet 2

INVENTOR.
Donald E. Ticknor
BY
Scofield, Kokjer, Scofield & Lowe
ATTORNEYS.

United States Patent Office 3,278,766
Patented Oct. 11, 1966

3,278,766
EMERGENCY STOP SIGNALING DEVICE FOR AUTOMOBILES
Donald E. Ticknor, Lake Quivera, Kans.
Filed Oct. 17, 1963, Ser. No. 316,902
6 Claims. (Cl. 307—118)

This invention relates to accessory equipment for automotive vehicles and refers more particularly to improved means for providing an externally visible warning signal indicating abnormally rapid deceleration of the vehicle such as would occur during the course of attempting to bring the vehicle to an emergency stop.

The invention constitutes an improvement in certain respects over the signalling device disclosed in my prior Patent 2,971,067 issued February 7, 1961.

One of the principal objects of the invention is to provide a simplified construction for an automatic warning device which makes possible the avoidance of special switches and the like and which permits a more rugged construction for the device. While the instant invention employs the principles of the device disclosed and claimed in my earlier patent, it has advantages thereover in compactness of construction, increased simplicity and reliability in operation and greater ruggedness under trying conditions.

A further object of the invention is to provide a device of the character described which can be produced at low cost and which, because of its cost factors, can readily be made available to motorists for incorporation in used vehicles as well as employed as original equipment in new vehicles. The device is easily mounted to the vehicle and is so constructed that it is readily protected from disablement or destruction by oil deposits or intrusion of other foreign matter which might otherwise interfere with its operation.

Still another object of the invention is to provide a device of the character described which operates only upon the application of deceleration forces above a certain prescribed minimum and yet which is easily returned to the inoperative position upon acceleration forces of considerably lesser degree.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views;

FIG. 1 is a fragmentary perspective view looking toward the fire wall of a typical automobile from inside the front engine compartment and illustrating the manner of mounting the device embodying the invention to the fire wall;

FIG. 2 is an enlarged front elevation of the device of FIG. 1, the casing being broken away to expose the interior mechanism;

FIG. 3 is a sectional view taken along the line 3—3 of FIG. 2 in the direction of the arrows;

FIG. 4 is a transverse sectional view taken along the line 4—4 of FIG. 2 in the direction of the arrows;

FIG. 5 is a transverse sectional view taken along the line 5—5 of FIG. 2 in the direction of the arrows;

Figure 6:
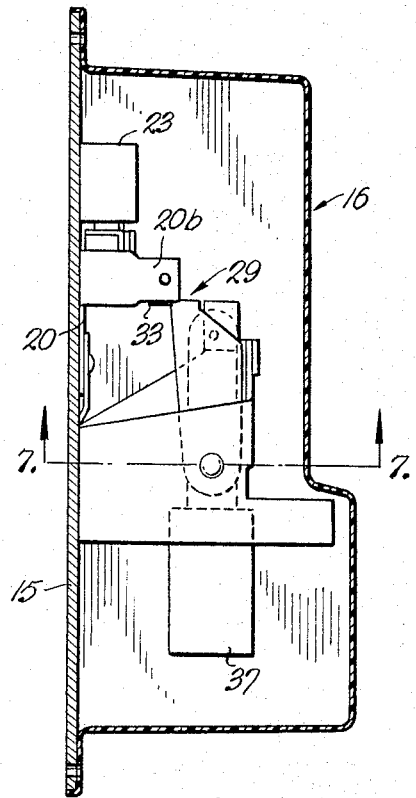
FIG. 6 is a view similar to FIG. 3 but illustrating the relative positions of the operating parts occurring during the deceleration of the vehicle sufficient to cause operation of the device.
Figure 7:
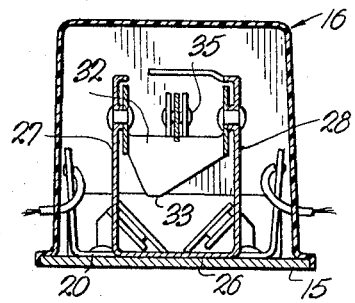
FIG. 7 is a sectional view taken along the line 7—7 of FIG. 6 in the direction of the arrows.

Referring to the drawings and initially to FIG. 1, reference numberal 10 indicates the fire wall of a typical automotive vehicle as viewed from the engine side thereof. The automobile hood is indicated at 11 and the pivot springs and braces therefor shown at 12 and 13, respectively. The hood is in the up position.

Mounted on the fire wall by upper and lower screws or bolts 14 is the device D which incorporates my invention and which is described in detail herebelow.

Referring now to FIGS. 2–5, inclusive, the device D comprises as its main element the flat base member 15 having the trapezoidal end sections 15a and 15b respectively. These sections are provided centrally with apertures 15c, 15d adapted to receive the screws 14 of FIG. 1 therethrough. Preferably, the base member 15 is composed or constructed from an electrical insulating medium such as pressed fiber board or the like. It is adapted to match with the periphery of the open side of a protective casing 16, which forms with the base member a hollow compartment 17 in which the operating components of the invention are housed.

Secured substantially centrally to the base member 15 by rivets 18 and 19, respectively, are a pair of generally plate-like connector members 20, 21. These members are constructed of an electrically conductive material such as steel or aluminum and have their inner, confronting edges separated as at 22 so that there is no conduction directly between them. At the upper ends of the members 20, 21 are located the outturned diverging, jaw-like clamping portions 20a, 21a, respectively. These are adapted to receive the correspondingly angled blades of a flasher unit 23, the blades being identified at 23a, 23b, respectively. The flasher unit is conventional construction, being of the type that intermittently breaks and recloses the circuit therethrough.

Side ears 20b, 21b, respectively, extend outwardly from the members 20 and 21. These have connected thereto the conductor wires 24, 25, respectively, which emerge from inside the casing through suitable apertures provided in the sides thereof as may be seen in FIG. 1.

Positioned below the plates 20, 21 and also centered substantially on the base member 15, is a yoke or carrier having the base leg 26 and the forwardly projecting side legs 27, 28 (FIG. 5). This yoke or carrier is also constructed of electrically conductive material and has on its right upper edge an extension 26a which is lapped over the lower margin of plate 21 and is secured firmly in contact therewith and to the base plate by the rivet 19 (FIG. 3). Each of the outstanding legs 27, 28 is provided with an inturned flange portion 27a, 28a. Also, the upper portion of flange 28a is furnished with a lateral extension 28b extending across toward the leg 27. Each of the legs 27, 28 further has at its lower extremity a forwardly projecting leg 27c or 28c, each of which terminates in an inturned flange 27d, 28d.

Figure 8:
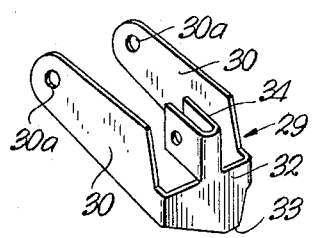
FIG. 8 is a detail perspective view of the pivotal contact arm disassociated from the remaining components of the device, shown for purposes of better understanding of its construction.

Supported between the legs 27 and 28 of the yoke or carrier and pivotally swingable therein about an axis parallel with the plane of the base plate 15 is the generally U-shaped pivot arm 29 which can perhaps best be understood as to its construction by referring to FIG. 8.

The pivot arm is provided with the parallel spaced legs 30, the legs being pivotally connected at their extremities through apertures 30a and rivets 31 to the opposed sides 27 and 28 of the yoke member. The legs 30 are connected at their upper ends by the cross portion 32 integral therewith. It will be noted that the cross portion has, on that edge facing the base member, an offset crest portion 33 which, in the position of the member 29 illustrated in FIGS. 2 through 5, is in direct contact with the outer surface of the member 20.

The cross portion 32 of member 29 has formed integrally therewith a clevis-like section 34 carrying a cross pin 35 between its parallel legs. The axis of pin 35 is parallel with the coinciding axes of the pivot rivets 31 for the member 29. The pin pivotally suspends a swingable member comprising the arm 36 which carries at its lower end the mass 37. It will be observed from FIG. 3 that arm member 29 is so formed and supported that the moment exerted by the mass 37 on the arm 29 about its pivot 31 is counterclockwise when the mass is plumb with its supporting pin 35. Thus, normally the arm 29 is biased to the position of FIGS. 2–5, that is with the crest 33 in firm surface-to-surface contact with the adjacent connector member 20.

It becomes important to understand at this juncture that when the swingable arm member 29 is in the FIGS. 2–5 position, it forms with its supporting yoke a low resistance current path from connector 24 to connector 25 in parallel with the flasher 23. The path is from connector portion 20b through the connector member 20, through crest 33 to member 29, into the yoke legs 27, 28 and to its base portion 26, and from there to connector 21 and portion 21b thereof through the overlapping extension 26b from the yoke. The arm 29 thus establishes a shunt path across the flasher 23 which can be broken by separating the arm and its crest portion 33 from the member 20.

Figure 9:
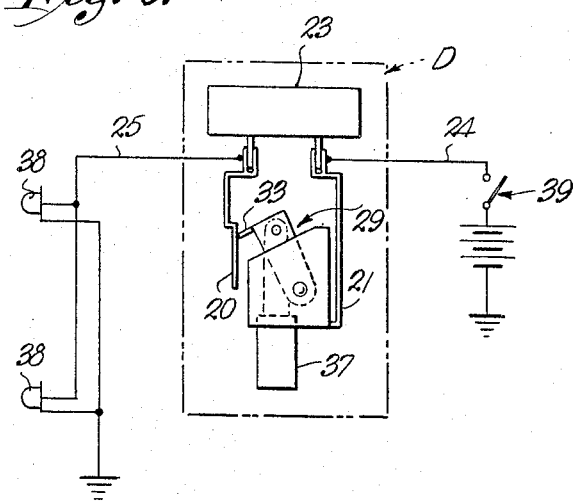
FIG. 9 is a diagrammatic illustration of the electrical circuit showing the manner in which the device is placed therein.

As seen in FIG. 9, the device D is connected into the circuit between the vehicle electric power source, which for convenience has been illustrated as a battery, and the rear or tail lamps 38 activated by braking of the vehicle. The brake switch is indicated at 39. The swingable arm 29 is shown schematically by the solid lines in its normal position corresponding to that of FIGS. 2–5 inclusive. In this position, it provides, as earlier seen, a shunt path across the flasher 23. Thus, as long as it remains in the normal condition, the flasher will be inoperative. The brake switch is the switch which is activated by depressing the brake pedal of the vehicle.

The operation of the invention is as follows. During normal operation of the vehicle and so long as the braking forces are held at a level which does not cause abnormal deceleration of the vehicle, the arm 29 will remain in the normal position of FIGS. 2–5 thus maintaining the flasher 23 inoperative. However, in the event that an emergency stop becomes necessary and greater braking forces are exerted on the vehicle, the mass 37 will, due to its momentum swing forwardly, exerting a moment on arm 29 which causes the arm 29 to swing clockwise, as viewed in FIG. 3, toward and into the position of FIG. 6. In this position, the crest 33 is separated from the member 20 and thus the electrical circuit through the device is broken. The full voltage of the system is thus applied to the flasher 23 and it begins to operate, causing intermittent energization and de-energization of the lamps 38.

So long as the arm 29 remains in a pivoted-away position with respect to the connector 20, the flasher will operate to cause intermittent illumination of the lamps. Arm 29 will stay in the separated condition with respect to connector 20 so long as the deceleration remains at that value at which mass 37 serves to hold it there.

The outer limit of movement of arm 29 is determined by the engagement of the flange portions 27a, 28a with the edges of the legs 30 of the member 29. Preferably, the relationship is such that when the arm 29 reaches its outer limit, the pin 35 is substantially vertically above or perhaps slightly forwardly of a vertical line through the pivot axis defined by rivets 31. The inturned leg portions 28d, 27d cooperate to prevent the mass 37 from striking against the inside of the casing 16 and to limit the degree of forward movement of the mass 37.

Obviously, so long as any braking forces sufficient to hold mass 37 so that its moment effect on arm 29 is clockwise are exerted, the arm will remain in the position of FIG. 6. However, as the vehicle reaches or passes through zero deceleration into the slightest acceleration, the mass will swing back through the plumb line and arm 29 will snap back into its normal position represented by FIGS. 2–5 inclusive. The shunt circuit past the flasher is thereupon reestablished and flashing will cease.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a circuit controlling device for creating a signal on rapid deceleration of a vehicle, the combination of a nonconductive base member mountable in the vehicle in an upright position and presenting a forward face, a support structure secured to said base member and projecting forwardly from said face, an arm pivoted at its lower end to said support structure for swinging movement of the upper end of the arm toward and away from said face, a pair of spaced electrically conductive connector members secured to said base member on said face, the upper end of said arm normally contacting one of said connector members, said arm and support structure also being electrically conductive and said support structure being connected electrically with the other connector member, and a mass pivotally suspended from the upper end of said arm and normally biasing said arm to said normal connector contacting position, the pivot axis of said mass being parallel with that of the arm.

2. In the combination of claim 1, a flasher having a pair of blade terminals, and draw means on said connector members for receiving, respectively, said blade terminals of the flasher.

3. In the combination of claim 1, the inclusion of stop means associated with said support structure and positioned to engage said arm after a selected forward pivotal displacement thereof.

4. In a circuit controlling device for creating a signal on rapid deceleration of a vehicle, the combination of a support, a first, electrically conductive connector member mounted on said support, an arm pivotally connected at one end with said support and having a free end movable toward and away from the support, impulse means responsive to deceleration connected to said arm and normally operable to bias said arm toward said support in a stabilized first position, a second electrically conductive member on said support, means closing a circuit from said first connector member to said second connector member when said arm is in said first condition, said means including a contact element carried by said arm in breakable electrical contact with said second connector member when said arm is in said first position, said impulse means operable to displace said arm away from said support and thereby separate said contact element from said second connector member in response to certain deceleration values encountered in the vehicle.

5. The combination as in claim 4 wherein said arm is electrically conductive and is included as a part of the circuit between said connector members.

6. The combination as in claim 4 including stop means for limiting the permissible displacement of said arm away from said support.

No references cited.

ORIS L. RADER, *Primary Examiner.*

T. B. JOIKE, *Assistant Examiner.*